(12) United States Patent
Lazich

(10) Patent No.: US 8,522,754 B2
(45) Date of Patent: Sep. 3, 2013

(54) FUEL INJECTOR CLAMP

(75) Inventor: Ivan M. Lazich, Chicago, IL (US)

(73) Assignee: International Engine Intellectual Property Company, LLC., Lisle, IL (US)

(*) Notice: Subject to any disclaimer, the term of this patent is extended or adjusted under 35 U.S.C. 154(b) by 606 days.

(21) Appl. No.: 12/828,400

(22) Filed: Jul. 1, 2010

(65) Prior Publication Data

US 2011/0073076 A1 Mar. 31, 2011

Related U.S. Application Data

(60) Provisional application No. 61/222,309, filed on Jul. 1, 2009.

(51) Int. Cl.
 *F02M 61/14* (2006.01)
(52) U.S. Cl.
 USPC .............................. 123/470; 29/888.4; 24/459
(58) Field of Classification Search
 USPC .................. 123/469, 470; 29/888.4; 24/459, 24/485
 See application file for complete search history.

(56) References Cited

U.S. PATENT DOCUMENTS

| | | | | |
|---|---|---|---|---|
| 4,901,700 A | * | 2/1990 | Knight et al. | 123/470 |
| 5,566,658 A | * | 10/1996 | Edwards et al. | 123/470 |
| 5,934,254 A | * | 8/1999 | Vetters et al. | 123/470 |
| 6,178,950 B1 | * | 1/2001 | Stockner et al. | 123/470 |
| 6,431,152 B1 | | 8/2002 | Estacio | |
| 6,532,939 B2 | * | 3/2003 | Ozeki | 123/470 |
| 6,745,752 B1 | | 6/2004 | Jensen | |
| 6,769,409 B2 | * | 8/2004 | Evancik et al. | 123/470 |
| 7,347,189 B2 | | 3/2008 | Anello | |
| 7,703,421 B2 | * | 4/2010 | Merchant et al. | 123/41.42 |
| 2004/0069280 A1 | * | 4/2004 | Evancik et al. | 123/470 |
| 2004/0159311 A1 | * | 8/2004 | Anello et al. | 123/470 |
| 2008/0295806 A1 | * | 12/2008 | Chang et al. | 123/470 |
| 2010/0024746 A1 | * | 2/2010 | Merchant et al. | 123/41.42 |
| 2012/0060797 A1 | * | 3/2012 | Engquist et al. | 123/470 |

* cited by examiner

*Primary Examiner* — Erick Solis
(74) *Attorney, Agent, or Firm* — Jeffrey P. Calfa; Mark C. Bach

(57) ABSTRACT

A fuel injector clamp and method of clamping a fuel injector includes clamp members each including a central body with a concaved section and two horizontally offset passageways. Clamp members are oppositely oriented such that the concaved section forms a region adapted to engage a fuel injector. Offset passageways are aligned such that a top passageway of one member is aligned with a bottom passageway of the opposing member. A fastening mechanism is passed through a first pair of aligned passageways to form a hinge, allowing clamp members to pivot about the hinge so a fuel injector can be disposed between the concaved sections. Members are then pivoted towards each other to close the clamp assembly; a second fastening mechanism is passed through a second pair of aligned offset passageways to lock the injector into place.

13 Claims, 8 Drawing Sheets

FUEL INJECTOR CLAMP

RELATION TO PREVIOUSLY FILED APPLICATIONS

This application claims the benefit of U.S. provisional application Ser. No. 61/222,309, filed Jul. 1, 2009.

FIELD OF THE INVENTION

This invention relates to internal combustion engines and more particularly to a fuel injection system.

BACKGROUND OF THE INVENTION

Most modern diesel engines, particularly diesel engines for large tractor-trailer trucks, use fuel injectors to deliver a desired fuel charge to an engine cylinder. The fuel injector is a nozzle which injects fuel, atomized by forcibly pumping fuel through the nozzle at high pressure, directly into the main combustion chamber of each cylinder. A fuel injector, particularly a fuel injector for use with a diesel engine, is required to accurately discharge a quantity of fuel into a combustion chamber of an internal combustion engine over a wide range of engine operating conditions.

Various factors are involved in the design and optimization of a fuel injection system. The air/fuel (A/F) ratio in the combustion chamber is controlled to achieve the desired engine performance, emissions, drivability, and fuel economy. Additional considerations in design of a fuel injection system include maintenance costs, reliability, physical space constraints, and adequate sealing.

The assembly of fuel injectors onto a cylinder head typically requires the use of fuel injector clamps which hold down, and secure the injector into the cylinder head. With demand for increase efficiencies of internal combustion engines, the number of valves that service a cylinder has increased. The fuel injection unit must be able to reside within the cluster of valves servicing the cylinder. Existing devices tend to be bulky, thereby adding to the crowding of components in the limited space on a cylinder head.

Prior art clamp arrangements include one bolt clamp with an injector hold down arm and a reaction force arm, and dual bolt clamps.

The present inventor has recognized that single bolt clamps allow for a slide-on clamping mechanism, however, the load and stresses experienced by the clamp is quite high. Dual bolt designs lowers the stress in the clamp, allows for more even loading of the fuel injector and the use of smaller bolts due to a lower required clamping force. However, with dual bolt designs, the clamp must be assembled on the injector, leading to more complex injector assembly and disassembly and thus, higher replacement costs.

The present inventor has recognized the need for a fuel injector clamp which encompasses the benefits of the dual bolt designs, without the need to assemble the clamp to the fuel injector.

The present inventor has recognized the need for a fuel injector clamp assembly that reduces loading and stress in the clamp, thus extending clamp lifespan and allowing a margin for increased loading on the injector if necessary.

The present inventor has recognized the need for a fuel injector clamp assembly that is less bulky and more suitable for use with cylinder heads with multiple valves.

The present inventor has recognized the need for a fuel injector assembly with a reduction in weight.

SUMMARY OF THE INVENTION

An exemplary embodiment of the invention provides a two part clamp assembly that is able to be secured to the cylinder head in an open configuration and then is able to be closed to engage the injector which then is able to be fastened to the cylinder head to complete the assembly.

According to an exemplary embodiment of the present invention, a fuel injector clamp assembly comprises a clamp member with a central body, and two offset passageways through which a fastening mechanism is passed. The central body further comprises a concaved section located equidistant from each of the offset passageways. The center of the radius of curvature of the concaved section is in a vertical plane containing the central axis of the offset passageway. The offset passageways extend laterally from the central body, each in opposite directions. The offset passageways are each substantially half the height of the central body, and extend from a top half of the central body or a bottom half of the central body.

The clamp member further comprises a flat side, and a vertically protruding side. The vertically protruding side is oriented downwards and comprises a vertical protrusion which comes into vertical contact with a ledge on the fuel injector. The vertical protrusion protrudes from the center body of the clamp member, such that the vertical protrusion is equidistant to each central axis of the offset passageway.

In use, two clamp members are oriented opposite one another such that a top offset passageway of one member is aligned with an opposing bottom offset passageway of another member to form a first set of aligned offset passageway. When the two clamp members are engaged, the concaved section faces each other to form a region adapted to engage a fuel injector. A first fastening mechanism, such as a shoulder bolt, is passed through the first set of aligned offset passageways, creating a hinge about which the two clamp members pivot. The two clamp members pivot away from each other such that a fuel injector can be placed between the concaved section of the clamp members. Once the fuel injector is in position between the two clamp members, the clamp assembly is closed by aligning the remaining set of opposing offset passageways to create a second set of aligned passageways. A second fastening mechanism is passed through the second set of aligned opposing offset passageways. The assembly is then placed in position on the cylinder head to be secured.

The assembly is secured to the cylinder head by tightening the first fastening mechanism into a threaded shaft in the cylinder head. The second fastening mechanism is aligned with a second threaded shaft in the cylinder head and tightened to a desired level of torque to fasten the clamp assembly to the cylinder head.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
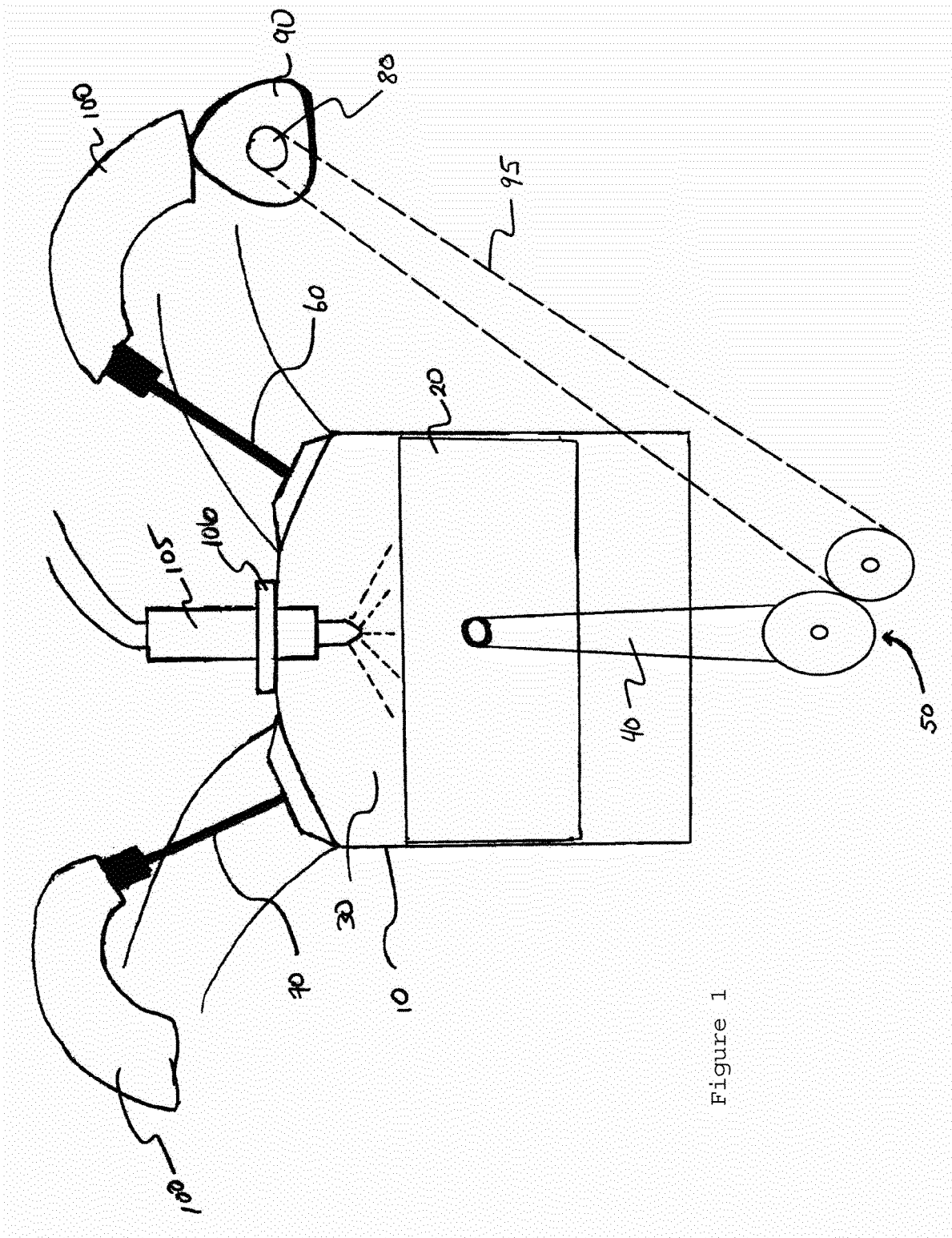
FIG. 1 is a schematic diagram of a cylinder in an internal combustion engine.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

A cylinder 10 in an internal combustion engine is illustrated in FIG. 1. A piston 20 in the cylinder reciprocates and defines engine strokes. A combustion chamber 30 is defined by the cylinder head above the piston and within the cylinder 10. The piston 20 is connected by a connecting rod 40 to a crankshaft 50, which in turn is connected to a drive chain 95 which drives a cam shaft 80. The cam shaft 80 drives a cam 90.

Inlet valve 60 and exhaust valve 70 are disposed on top of the cylinder 10, and are driven in a timed relationship to the movement of the piston 20. Inlet valve 60 and exhaust valve 70 are connected to rocker arms 100, which are each in contact with a cam 90 (not shown for inlet valve 60). The opening and closing of the valves 60, 70 is controlled by the movement of the rocker arm 100. Because the rocker arm is in connection with the piston via the cam 90, cam shaft 80, crankshaft 50 and connecting rod 40, the opening and closing of the valves 60, 70 is dependent on the movement of the piston 20, and can be timed relative to the movement of the piston 20.

The internal combustion engine of FIG. 1 comprises a fuel injection system. The fuel injection system comprises a fuel injector 105, held in place on the top of the cylinder 10 by a clamping mechanism 106. The fuel injector 105 injects atomized fuel into the combustion chamber 30. An engine control unit (ECU) (not shown) controls the timing and amount of fuel that is injected into the combustion chamber 30. Discharge of fuel typically occurs during a certain crank angle, such as, for example 30 degrees, regardless of engine rotational speed.

Figure 2:
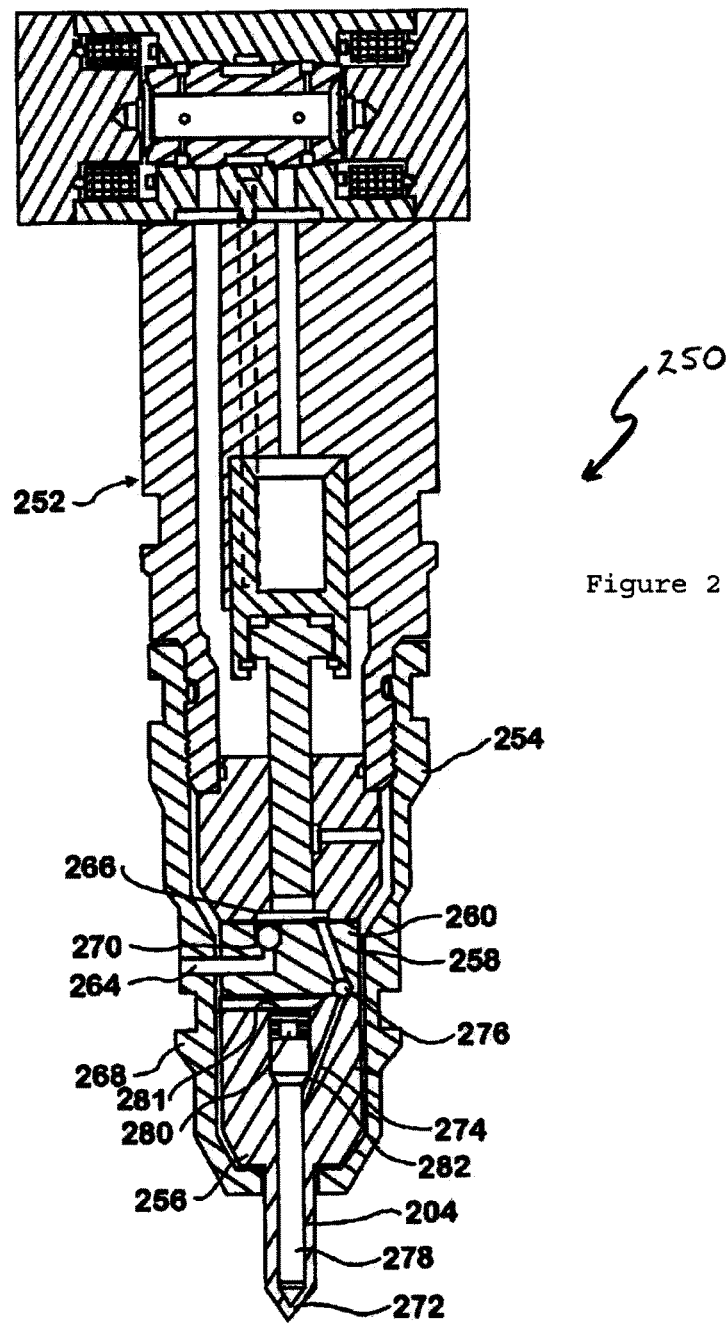
FIG. 2 is a schematic diagram of a fuel injector.

FIG. 2 illustrates a typical fuel injector 250. The fuel injector 250 is typically mounted to an engine block as illustrated in FIG. 1 and injects a controlled pressurized volume of fuel into a combustion chamber 30. The fuel injector 250 has an injector housing 252 that is typically constructed from a plurality of individual parts. The housing 252 includes an outer casing 254 that contains block members 256, 258, and 260. The outer casing 254 has a fuel port 264 that is coupled to a fuel pressure chamber 266 by a fuel passage 268. A first check valve 270 is located within fuel passage 268 to prevent a reverse flow of fuel from the pressure chamber 266 to the fuel port 264. The pressure chamber 266 is coupled to a nozzle chamber 204 and to a nozzle 272 by means of fuel passageway 274. A second check valve 276 is located within the fuel passage 274 to prevent a reverse flow of fuel from the nozzle 272 and the nozzle chamber 204 to the pressure chamber 266.

The flow of fuel through the nozzle 272 is controlled by a needle valve 278 that is biased into a closed position by spring 280 located within a spring chamber 281. The needle valve 278 has a shoulder 282 in the nozzle chamber 204 above the location where the passage 274 enters the needle valve 278. When fuel flows in the passage 274, the pressure of the fuel applies a force on the shoulder 282 in the nozzle chamber 204. The shoulder force acts to overcome the bias of spring 280 and lifts the needle valve 278 away from the nozzle 272, allowing fuel to be discharged from the injector 250.

The fuel injector is typically clamped into place on the cylinder head. The fuel injector clamp assembly comprises a clamp member 310, with a central body 315, illustrated in FIG. 3A-D that is used in pairs for each fuel injector. The clamp member 310 further comprises a pair of offset passageways 330 on either end of the clamp member 310.

Figure 3D:
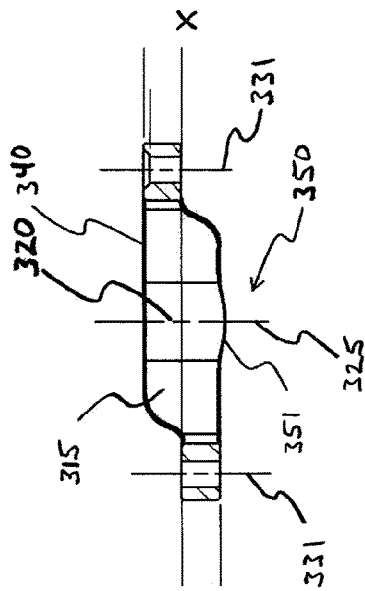
FIG. 3D is a sectional view along line 3D-3D of FIG. 3B.
Figure 3B:
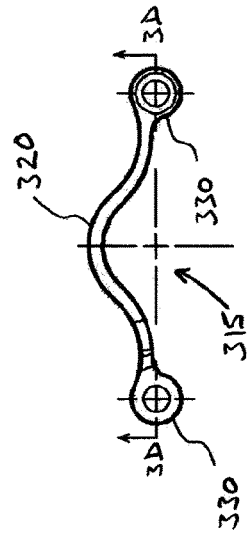
FIG. 3B is a top view of the clamp member of FIG. 3A.
Figure 3C:
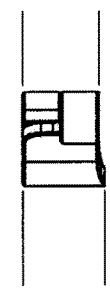
FIG. 3C is a side view of the clamp member of FIG. 3A.
Figure 3A:
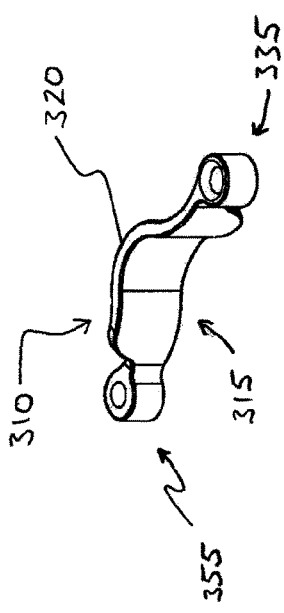
FIG. 3A is a perspective view of a clamp member of one exemplary embodiment of the present invention.

The central body 315 includes a concaved section 320. The concaved section 320 is a lateral protrusion in the central body 315. The center line of concavity 325, as illustrated in FIG. 3D, is located equidistant from the central axis 331 of each offset passageway 330, and within the same plane as the central axis 331.

The offset passageways 330 extend laterally from the central body 315, each in opposite directions to form base ends 355 of the clamp member, and are offset on either side of a central horizontal axis X of the clamp member. The offset passageways are each substantially half the height of the central body, and extend from a top half of the central body or a bottom half of the central body with the top or bottom half defined by central horizontal axis X, as illustrated in FIG. 3D. Fastening mechanisms, such as shoulder bolts 360, 370 illustrated in FIG. 4, are passed through the offset passageways 330.

The clamp member 310 further comprises a flat side 340, and a vertically protruding side 350. In use, the vertically protruding side 350 is oriented downwards and comprises a vertical protrusion 351 which comes into vertical contact with a ledge on the fuel injector. The vertical protrusion 351 protrudes from the lower half of the central body 315, and is equidistant from the central axis 331 of the offset passageways 330 (FIG. 3D).

Figure 5:
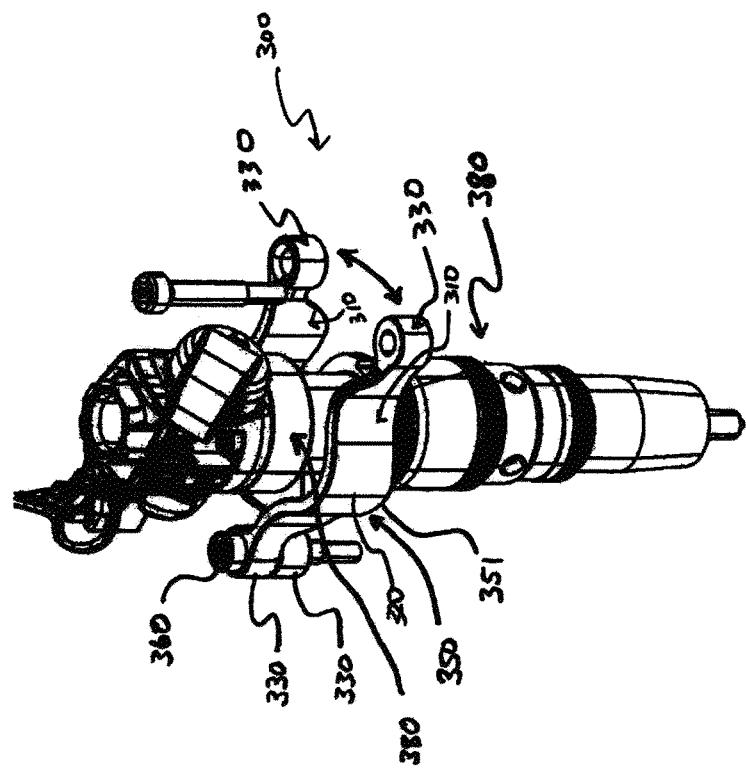
FIG. 5 is a perspective view of the fuel injector clamp in use with a fuel injector.
Figure 4:
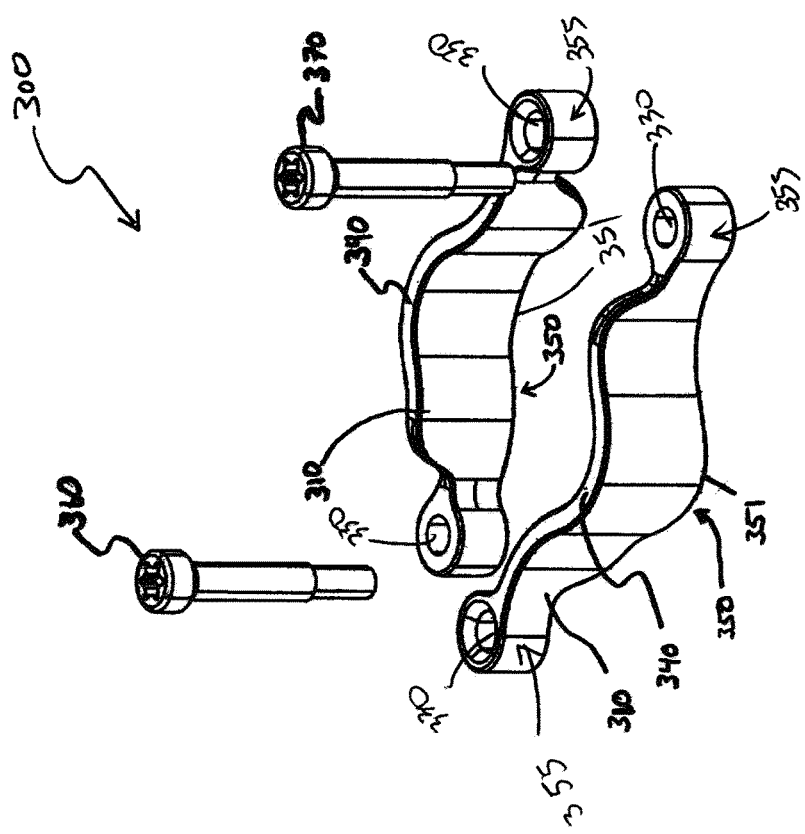
FIG. 4 is an exploded view of an exemplary embodiment of the present invention.
Figure 6:
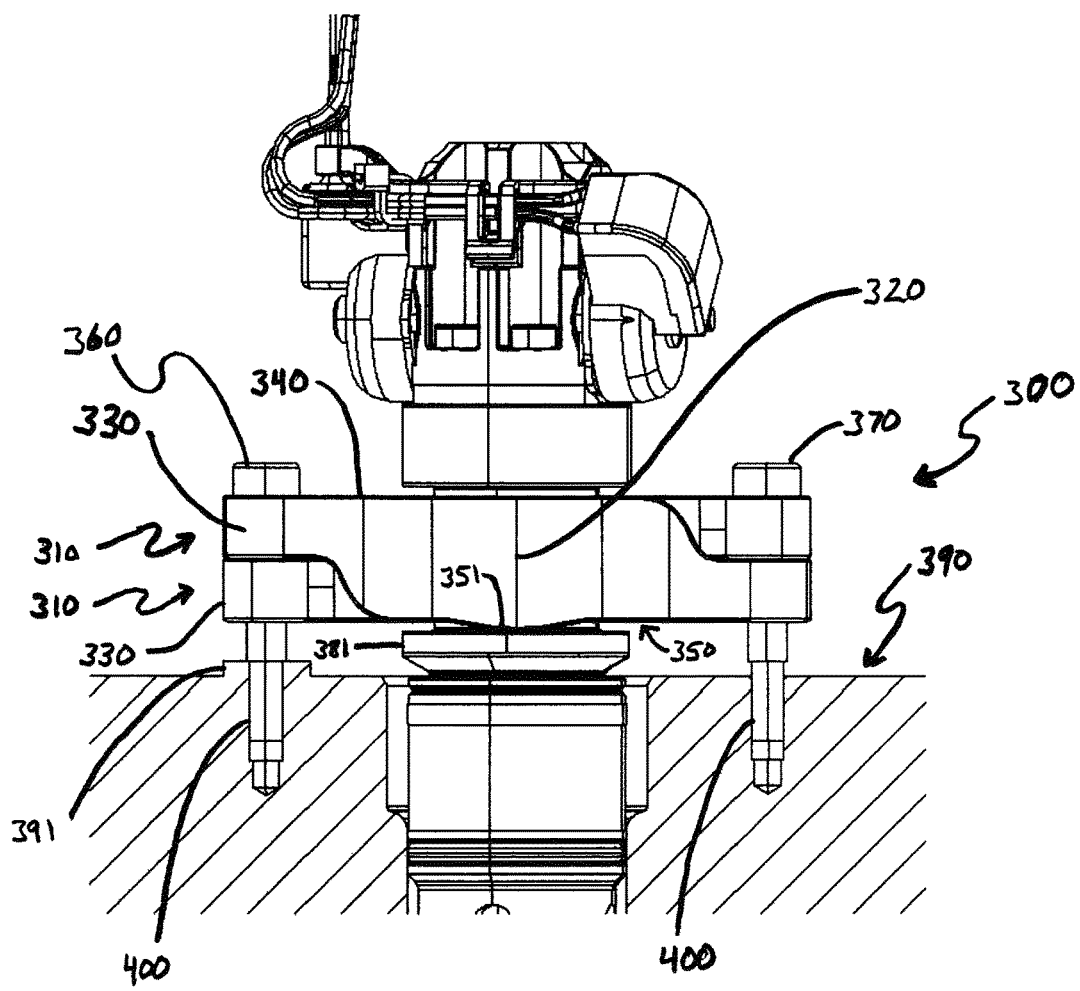
FIG. 6 is a side view of the fuel injector clamp in use with a fuel injector on a cylinder head.
Figure 7:
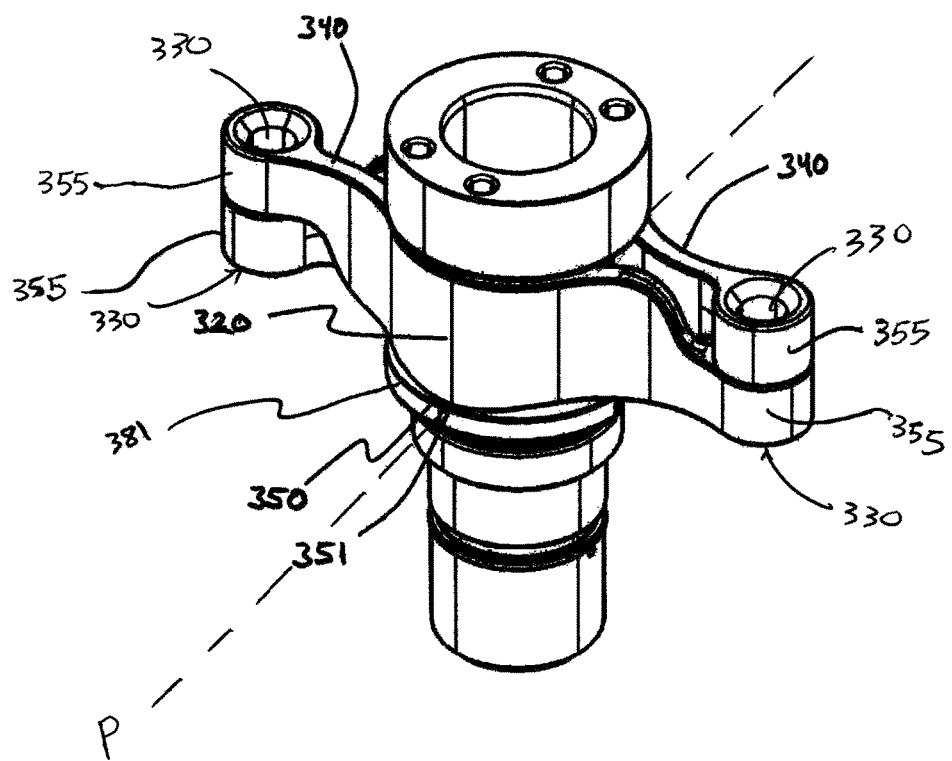
FIG. 7 is a perspective view of the fuel injector clamp in its closed position.

FIG. 4 illustrates the components of the fuel injector clamp assembly in exploded view. The fuel injector clamp assembly 300 utilizes two clamp members 310, and fastening mechanisms—illustrated as two shoulder bolts, a rear shoulder bolt 360, and a front shoulder bolt 370. In use, the two clamp members 310 engage with each other when one of the clamp members is rotated 180° horizontally from the other such that a top offset passageway of one member is aligned with the bottom offset passageway of the opposing member to form a first set of aligned offset passageways as illustrated in FIGS. 5-7. When the two clamp members are engaged the concaved sections 320 face each other to form a region adapted to engage a fuel injector.

To assemble the fuel injector clamp 300 around the fuel injector 380 as illustrated in FIG. 5, the rear shoulder bolt 360 is inserted through one pair of aligned offset passageways 330. The insertion of the rear shoulder bolt 360 creates a hinge about which the two members 310 may pivot. The two clamp members pivot away from each other such that a fuel injector can be placed between the concaved sections 320 of the clamp members 310. The region adapted to engage a fuel injector formed by the opposing concaved sections when the clamp assembly is closed comes in contact with the generally rounded circumference of the fuel injector housing 380.

Once the fuel injector 380 is inserted into place between the two clamp members 310, the clamp assembly 300 is closed by pivoting the open ends of the clamp members 310 towards each other and aligning the remaining set of opposing offset passageways to create a second set of aligned passageways as illustrated in FIG. 7. A second fastening mechanism, for example a front shoulder bolt 370, is passed through the second set of aligned opposing offset passageways to lock the fuel injector in place (FIG. 5). The assembly is then placed in position on the cylinder head to be secured as illustrated in FIG. 6. Alternatively, the rear shoulder bolt 360 can be inserted through a pair of aligned offset passageways 330 and at least partially tightened into a threaded shaft 400 in the cylinder head 390 which receives the bolt, before the fuel injector is disposed between the two clamp members.

Figure 8:
FIG. 8 is a top view of the fuel injector clamp in position relative to valves on the cylinder head.

The assembly is secured to the cylinder head by tightening the first fastening mechanism, the rear bolt 360, into a threaded shaft 400 in the cylinder head 390. The rear bolt 360 is tightened until it makes contact with a boss 391 on the cylinder head 390. The front bolt is then tightened in a second threaded shaft 400 to the desired torque load. There is no boss feature in the cylinder head 390 for the front bolt 370 in order to ensure that a sufficient load is exerted on the ledge 381 before the bolt reaches a maximum threading (bottoms out) into the cylinder head. FIG. 8 is a top view of the fuel injector and clamp assembly situated among valves on a cylinder head.

The removal process of the injector is facilitated using the clamp assembly 300, as the clamp assembly need not be disassembled from the fuel injector in order to remove the fuel injector. To remove the fuel injector, the front bolt 370 is removed and the two clamp members 310 are pivoted away from each other, while still connected on the opposite end by the rear bolt 360. Once the clamp is opened, the injector can be removed easily.

As illustrated in FIGS. 3-7, the vertically protruding side 350 comprises a vertical protrusion 351, which is in vertical contact with a ledge 381 on the fuel injector 380, as illustrated in FIG. 6. Without wishing to be bound by any particular theory, it is believed that the vertical protrusion 351 allows for an even distribution of forces across the clamping assembly 300.

Figure 9:
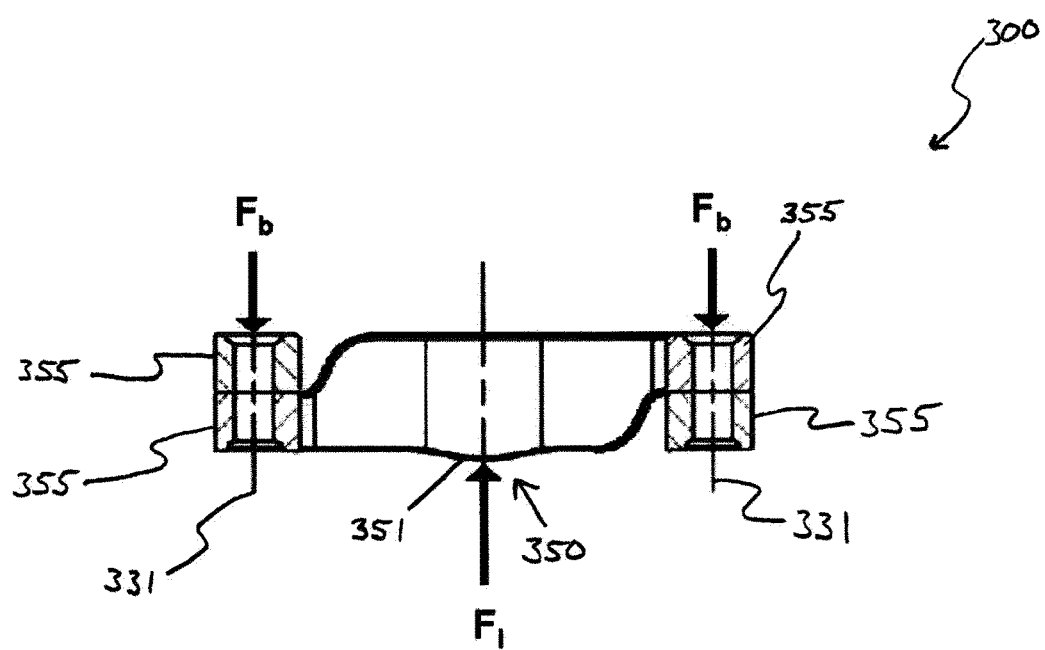
FIG. 9 is a schematic diagram of a side view of the clamp assembly illustrating some of the forces acting on the clamp assembly.

The force of the injector and the downward clamping force of the rear and forward shoulder bolts 360, 370 exerted on the base ends 355 are illustrated in FIG. 9. The vertical protrusion is located in the center of the clamp member 310, between the central axis 331 of each offset passageway 330, such that the distance from the vertical protrusion 351 to each of the central axis 331 of the offset passageway is the same. When the first fastening mechanism, the rear shoulder bolt 360, is fully threaded into the cylinder head, the base ends 355 have a degree of movement along the first fastening mechanism. The vertical protrusion 351 disposed in contact with the fuel injector creates a pivot point between the two ends of the clamp assembly 300. As the second fastening mechanism is threaded into the cylinder head and tightened to a preselected torque, the clamp members press on the fuel injector along a pivot axis P (FIG. 7), containing the vertical protrusion 351. Because of the inverse symmetrical alignment of the clamp members 310 as an assembled unit, the force distributed by the vertical protrusion 351 is evenly distributed throughout the clamping device. Accordingly, the clamping force $F_B$ exerted by each bolt on the base ends 355 of the clamp members, is substantially the same. FIG. 9 illustrates the upward force $F_i$, or thrust, the fuel injector exerts on the clamp assembly 300 when the fuel injector discharges atomized fuel into the combustion chamber for ignition. The rear and front shoulder bolts (not show in FIG. 9), each exert an equal downward clamping force $F_B$ which is substantially equal to ½ $F_i$.

The clamp assembly is advantageously comprised of cast metal that is quenched and tempered to Rc 45-55 standards, while the fastening mechanisms advantageously comprise of class 12.9 phosphate coated metal. One with skill in the art readily recognizes that other types of materials may be utilized as long as the clamp assembly and the fastening mechanisms secure the injector to the cylinder head while adequately withstanding any forces encountered during the operation of the engine.

The clamp assembly of the present invention allows loading and other stresses to be reduced in the clamp. As a result of decreasing the stress and loading in the clamp, the clamp assembly allows for a margin for increased loading on the fuel injector if necessary.

The clamp assembly design also provides a lighter weight clamp assembly than previous clamp assemblies made of the same material. The clamp member design and the dual bolt component allows two smaller bolts to be used thus reducing the clamping force by distributing it evenly across the two bolts. This weight reduction may lead to cost reductions and additional efficiency of the engine. The clamp assembly design takes up less room on the top of the cylinder head (FIG. 8), which creates more room to allow for tighter valve packaging.

Although the present invention is described above with respect to a fuel injector fastened to a cylinder head, it is possible to utilize the clamp and fastener approach to devices other than a fuel injector and to devices fastened to platforms other than a cylinder head.

Parts List

10 Cylinder
20 Piston
30 Combustion chamber
40 Connecting rod
50 Crankshaft
60 Inlet valve
70 Exhaust valve
80 Cam shaft
90 Cam
95 Drive chain
100 Rocker arms
105 Fuel injector
106 Clamping mechanism
204 Nozzle chamber
250 Fuel injector
252 Injector housing
254 Outer casing
256 Block members
258 Block members
260 Block members
264 Fuel port
266 Fuel pressure chamber
268 Fuel passage
270 First check valve
272 Nozzle
274 Fuel passageway
276 Second check valve
278 Needle valve
280 Spring
281 Spring chamber 282 Shoulder
300 Fuel injector clamp assembly
310 Clamp member
315 Central body
320 Laterally protruding section
325 Center line of concavity
330 Offset passageways
331 Center axis
340 Flat side
350 Vertically protruding side
351 Vertical protrusion
355 Base end
360 Rear shoulder bolt
370 Front shoulder bolt
380 Fuel injector
381 Ledge
390 Cylinder head
391 Boss
400 Threaded shaft From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A clamping device for holding a fuel injector to a cylinder head of an internal combustion engine, comprising:
a clamp assembly having a first clamp member and a second clamp member, the first and second clamp members adapted to be pivotally connected together at base ends thereof by a first connection, and removably connected at distal ends thereof by second connection, the clamp members being configured to have a space there between that is adapted to capture a fuel injector when the base ends and distal ends are respectively connected together, the clamp assembly being fastenable to the cylinder head and the distal ends being separable by disconnecting the second connection in order to remove a fuel injector from the cylinder head.

2. The clamping device according to claim 1, wherein the first and second clamp members are identically configured.

3. The clamping device according to claim 1, wherein the first connection connects the base ends of the first and second clamp members to the cylinder head, and the second connection connects the distal ends of the first and second clamp members to the cylinder head.

4. The clamping device according to claim 1, wherein the first and second clamp members each have a concave curvature between respective base and distal ends.

5. The clamping device according to claim 1, wherein when the first and second clamp members are respectively connected at base and distal ends, the base ends of the first and second clamp members overlap and the distal ends of the first and second clamp members overlap.

6. The clamping device according to claim 1, wherein the first connection comprises a first fastener that connects the base ends of the first and second clamp members to the cylinder head, and the second connection comprises a second fastener that connects the distal ends of the first and second clamp members to the cylinder head, wherein the base ends have a degree of movement along the first fastener when the first fastener is fully threaded into the cylinder head, wherein the first and second clamp members press the fuel injector along a pivot axis toward the cylinder head when the second fastener is threaded into the cylinder head and tightened to a preselected torque.

7. A method of clamping a fuel injector on to a cylinder head comprising the steps of:
oppositely engaging a pair of clamp members by aligning one clamp member at 180 degrees from the other such that flat sides of each clamp member face upwards, and concaved sections from each clamp member face each other to form a region adapted to engage a fuel injector;
aligning a first set of offset passageways on one end of the oppositely engaged clamp members to form a first set of aligned offset passageways;
passing a first fastening mechanism through the first set of aligned offset passageways;
disposing a fuel injector between the oppositely engaged clamp members;
aligning a second set of offset passageways on the other end of the oppositely engaged clamp members to form a second set of aligned offset passageways;
passing a second fastening mechanism through the second set of aligned offset passageways;
tightening the first fastening mechanism into the cylinder head; and
tightening the second fastening mechanism into the cylinder head.

8. The method of claim 7, wherein the step of aligning a first set of offset passageways further comprises the step of lining up a top offset passageway of one clamp member with a bottom offset passageway on the opposing member.

9. The method of claim 7, wherein the step of passing a first fastening mechanism through the first set of aligned offset passageways effectively creates a hinge about which each clamp member can pivot.

10. The method of claim 9, wherein the step of disposing a fuel injector between the clamp members further comprises the step of pivoting the clamp members away from each other about the hinge such that enough space is created between the concaved sections of each clamp member for a fuel injector to be disposed between the concaved sections.

11. The method of claim 7, wherein the step of aligning a second set of offset passageways on the other end of the oppositely engaged clamp members to form a second set of aligned offset passageways further comprises the step of pivoting the clamp members towards each other.

12. The method of claim 7, wherein the step of tightening the first fastening mechanism further comprises the step of tightening the first fastening mechanism in a threaded bore until the first fastening mechanism makes contact with a boss on the cylinder head.

13. The method of claim 7, wherein the step of tightening the second fastening mechanism further comprises the step of tightening the second fastening mechanism in a threaded bore until a desired torque load is reached.

* * * * *